US007796198B2

(12) United States Patent
Ikeda et al.

(10) Patent No.: US 7,796,198 B2
(45) Date of Patent: Sep. 14, 2010

(54) DISPLAY CONTROL APPARATUS OF DISPLAY PANEL, AND DISPLAY DEVICE HAVING DISPLAY CONTROL APPARATUS

(75) Inventors: Hiroki Ikeda, Kawasaki (JP); Toshio Ueda, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 1247 days.

(21) Appl. No.: 11/353,742

(22) Filed: Feb. 14, 2006

(65) Prior Publication Data

US 2006/0214927 A1 Sep. 28, 2006

(30) Foreign Application Priority Data

Feb. 24, 2005 (JP) ............................ 2005-048488

(51) Int. Cl.
*H04N 5/66* (2006.01)

(52) U.S. Cl. ...................... 348/739; 348/441; 348/458; 348/790

(58) Field of Classification Search ......... 348/790–792, 348/558, 751, 766, 511–512, 761, 521, 525, 348/441, 458, 739; *H04N 5/66, 7/01, 11/20*
See application file for complete search history.

(56) References Cited

U.S. PATENT DOCUMENTS

| | | | | |
|---|---|---|---|---|
| 6,563,484 | B1 * | 5/2003 | Song | 345/98 |
| 6,927,746 | B2 * | 8/2005 | Lee et al. | 345/3.2 |
| 7,061,540 | B2 * | 6/2006 | Weaver et al. | 348/500 |
| 7,609,329 | B2 * | 10/2009 | Baek et al. | 348/790 |

FOREIGN PATENT DOCUMENTS

| | | |
|---|---|---|
| JP | A 7-115618 | 5/1995 |
| JP | 8-076716 | 3/1996 |
| JP | A 8-125943 | 5/1996 |
| JP | A 10-260667 | 9/1998 |
| JP | 10-307562 | * 11/1998 |
| JP | A 2004-320130 | 11/2004 |

* cited by examiner

*Primary Examiner*—Trang U Tran
(74) *Attorney, Agent, or Firm*—Greer, Burns & Crain, Ltd.

(57) ABSTRACT

In a display control apparatus which is supplied with an input synchronizing signal and an input video signal, and which generates display data from the input video signal on the basis of the input synchronizing signal, and supplies the display data to display means, when a change is detected in a cycle of the input synchronizing signal, the display means is supplied with display data of a frame prior to the occurrence of the change in the cycle, throughout a subsequent predetermined number of frame periods.

7 Claims, 6 Drawing Sheets

WHEN NOISE OCCURS IN EVsync

DISPLAY CONTROL APPARATUS OF DISPLAY PANEL, AND DISPLAY DEVICE HAVING DISPLAY CONTROL APPARATUS

CROSS-REFERENCE TO RELATED APPLICATIONS

This application is based upon and claims the benefit of priority from the prior Japanese Patent Application No. 2005-048488, filed on Feb. 24, 2005, the entire contents of which are incorporated herein by reference.

BACKGROUND OF THE INVENTION

1. Field of the Invention

The present invention relates to a display control apparatus of a display panel and a display device with the display control apparatus. Particularly the present invention relates to a display control apparatus which prevents distortion of a display screen when, for example, switching the video modes, and to a display device having the display control apparatus.

2. Description of the Related Art

A display panel device to which the present invention is applied is a device such as a plasma display panel ("PDP" hereinafter) or a liquid crystal display panel ("LCD" hereinafter), which generates display data by performing predetermined signal processing on an input video signal to display an image corresponding to the input video signal by means of the display data.

The above display panel device is configured with a display control apparatus which inputs, for example, an NTSC input video signal and a synchronizing signal (or a composite signal in which the both signals are combined) and processes the input video signal according to the synchronizing signal to create display data required for display control, and a display panel which is drive-controlled on the basis of the display data generated by the display control apparatus. The display control apparatus monitors a cycle of input synchronizing signal to judge a video mode, and generates the display data from the input video signal on the basis of the judged video mode.

To describe the PDP as an example, one frame is configured with a plurality of sub-frames having sustained discharge periods which are different from one another. By combining the plurality of sub-frames accordingly, luminance which is required in the frames is realized. For this reason, the display control apparatus extracts a gradation value of each pixel, from an input video signal supplied sequentially for each dot, on the basis of a synchronizing signal, and further converts the gradation value of each pixel into sub-frame data to generate the display data. In other words, the display data comprises the sub-frame data.

The sub-frame data has at least an address period and sustained discharge period, thus requiring corresponding periods. For this reason, the number of sub-frames which can be displayed within one frame depends on the image mode in which a cycle of the input synchronizing signal is different. Therefore, the display control apparatus needs to determine the video mode according to the input synchronizing signal, and generates the display data in accordance with the number of sub-frame corresponding to the determined video mode. Japanese Patent Application Laid-Open No. H8-76716, for example, describes internal display control performed in accordance with the different video modes as described above.

On the other hand, after generating the display data of a frame (this is the sub-frame data in the example of the PDP), the display control apparatus stores the display data in a frame memory once. In a following frame period, the display control apparatus reads the display data stored in the frame memory, and supplies it to the display panel. In the display panel, electrode drive is performed inside the panel in accordance with the supplied display data. This frame memory has a first frame memory region in which display data corresponding to an input video signal of a present frame is written, and a second frame memory region in which display data to be displayed in the present frame is read out. When the display data corresponding to the input video signal is written in the first frame memory region during a certain frame period, the display data is read out from the first frame memory region in the next frame period, and is used for display control in the display panel. Then, in the above frame period the display data corresponding to the input video signal is written in the second frame memory region. In this manner, the frame memory has a double buffer structure comprising the writing region and the reading region. Japanese Patent Application Laid-Open No. H10-307562, for example, describes such frame memory having the double buffer structure.

There are a plurality of types of video modes for the video signals of the display device. For example, in a NTSC TV signal, a video signal is configured on the basis of a 60 Hz-synchronizing signal, but a video mode with a 50 Hz synchronizing signal or a video mode with a 70 Hz synchronizing signal can be considered. It is required that the display device appropriately display images corresponding to the input video signals of such different video modes.

A problem in this case rises in the display control method when the video modes are switched. When a video mode with a 60 Hz synchronizing signal is switched to a video mode with a 50 Hz synchronizing signal, the display control apparatus monitors the cycle of the input synchronizing signal, judges that the cycle of the input synchronizing signal has been switched, and generates display data on the basis of the judged video mode.

However, at the moment when the video mode is switched, in the frame in which the switching is carried out, display data, which is created from an input video signal of a video mode before the switching, and display data, which is created from an input video signal of a video mode after the switching, are written in the frame memory. Therefore, when the written display data is read out and supplied to the display panel in the next frame, a distorted image is displayed.

Similarly, when a transmittance station (channel) is switched, synchronization is not performed between the channels even if the same video mode is used. Therefore, at the time of switching, display data of both channels are written in a frame memory in the frame in which the switching is generated, thus the same problem, which has occurred when switching the video mode, occurs.

Moreover, when judging whether to switching a synchronizing signal, the display control apparatus detects switching of a video mode only after confirming that a synchronizing signal of the same cycle is inputted continuously throughout a plurality of frames. Accordingly, it can be avoided that switching of the video mode is detected mistakenly by over-responding to noise that overlaps with the synchronizing signal. Therefore, in several frame periods immediately after the video mode is switched, the video mode in the display control apparatus and the video mode of the input video signal do not conform to each other, thus the displayed image during this period is distorted.

In the prior art, in consideration of the above problems, a whole black image is displayed in a predetermined number of frames when switching the video mode. However, displaying the whole black image in the frames is not always tolerated by users, thus other display control apparatus is desired.

SUMMARY OF THE INVENTION

An object of the present invention, therefore, is to provide a display control apparatus in which an image is prevented from being distorted when switching a video mode, and a display device having the display control apparatus.

In order to achieve the above object, according to a first aspect of the present invention, in a display control apparatus which is supplied with an input synchronizing signal and an input video signal, and which generates display data from the input video signal on the basis of the input synchronizing signal, and supplies the display data to display means, when a change is detected in a cycle of the input synchronizing signal, the display means is supplied with display data of a frame prior to the occurrence of the change in the cycle, throughout a subsequent predetermined number of frame periods. In other words, the cycle is monitored and when a change in the cycle of the input synchronizing signal is generated, display data of a frame prior to the generation of the change in the cycle is outputted and displayed until the processing of switching the video mode is completed, whereby distortion of an image during switching the video mode can be minimized. When the processing of switching the video mode is completed, display data corresponding to the input video signal is supplied to the display means as in the usual way.

A preferred embodiment in the abovementioned first aspect of the present invention, the display control apparatus has a video mode determination unit which determines a video mode on the basis of the input synchronizing signal, a display data generation unit which generates display data from the input video signal, a frame memory which stores the display data in correspondence to a frame, and a memory control unit which controls writing and reading of the display data with respect to the frame memory. The memory control unit writes first display data generated from an input video signal of a first frame into the frame memory, reads the first display data from the frame memory in a second frame which is subsequent to the first frame, and supplies this first display data to the display means. Further, when the video mode determination unit detects a change in a cycle of the input synchronizing signal in the second frame period, in respond to this the memory control unit repeatedly supplies the first display data to the display means during a subsequent predetermined number of frame periods. According to this configuration, when a change occurs in a cycle of the input synchronizing signal, during a subsequent period the first display data which is stored in the first frame prior to the occurrence of the change in the cycle is supplied to the display means, thus an image with no distortion can be displayed, and distortion of images can be avoided.

In a further preferred embodiment in the abovementioned first aspect of the present invention, the display control apparatus has a video mode determination unit which determines a video mode on the basis of the input synchronizing signal, a display data generation unit which generates display data from the input video signal, a frame memory which stores the display data in correspondence to a frame, and a memory control unit which controls writing and reading of the display data with respect to the frame memory. The memory control unit writes display data of the input video signal of a present frame into a first frame memory region and a second frame memory region alternately, reads display data of the input video signals of previous frames alternately, and supplies the display data to the display means. Furthermore, when the video mode determination unit detects a change in a cycle of the input synchronizing signal, in respond to this the memory control unit repeatedly supplies the display data, which is written into the frame memory during a frame period prior to the detection of the change in the cycle, to the display means during a subsequent predetermined number of frame periods.

In a yet further preferred embodiment according to the abovementioned embodiments, the display data is repeatedly and continuously supplied until the video mode determination unit determines the stability of the cycle of the input synchronizing signal to determine the video mode. Accordingly, during a period of time in which the video mode is determined internally and internal operation is controlled under a new video mode, the same display data is outputted, and the display means can be caused to display a static image obtained from the display data. Therefore, at least distortion of images can be avoided.

In order to achieve the above object, according to a second aspect of the present invention, in the display control apparatus which is supplied with an input synchronizing signal and an input video signal, and which generates display data from the input video signal on the basis of the input synchronizing signal, and supplies the display data to display means, when a change is detected in the video mode of the input synchronizing signal, the display means is supplied with display data of a frame prior to the occurrence of the change in the video mode, during a subsequent predetermined number of frame periods. Also, after the predetermined number of frame period, the display means is supplied with display data corresponding the input video signal.

According to the present invention, when the video mode is switched, an image with no distortion can be displayed, and distortion of images can be avoided.

DESCRIPTION OF THE PREFERRED EMBODIMENTS

Embodiments of the present invention are described hereinafter with reference to the drawings. However, the technological scope of the present invention is not limited to these embodiments, thus the present invention extends to the technical scope described in the scope of the patent claims and to the equivalent items.

Figure 1:
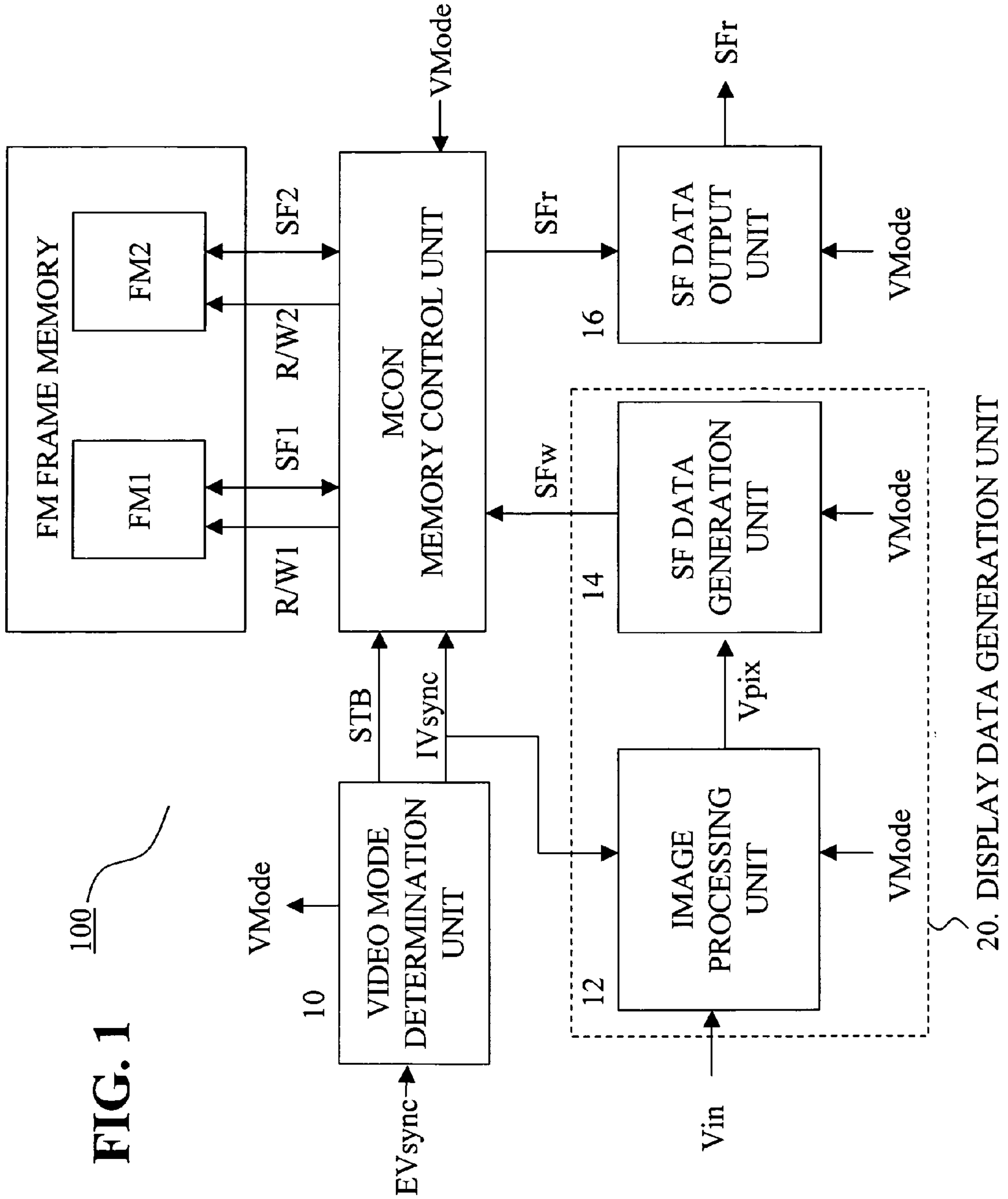
FIG. 1 is a configuration diagram of the display control apparatus according to an embodiment.

FIG. 1 is a configuration diagram of the display control apparatus according to an embodiment. A display control apparatus 100 of FIG. 1 comprises a video mode determination unit 10 which monitors a cycle of an external synchronizing signal EVsync to determine a video mode from the cycle, a display data generation unit 20 which generates display data SFw from an input video signal Vin, a frame memory FM in which the display data is stored temporarily, and a memory control unit MCON which controls writing and reading of the display data with respect to the frame memory FM. The video mode determination unit 10 monitors a cycle of the external synchronizing signal EVsync to determine a video mode, and generates a video mode signal VMode. The video mode determination unit 10 further cuts noise from the external synchronizing signal EVsync, generates an internal synchronizing signal IVsync, monitors the cycle of the external synchronizing signal EVsync, and changes a stabilized signal STB to a stable state when stabilized cycles are detected, or changes the stabilized signal STB to an unstable state when the cycle changes.

The display data generation unit 20 comprises an image processing unit 12 and a sub-frame creation unit 14. The image processing unit 12 extracts a gradation value of each pixel, from the video signal Vin, on the basis of the internal synchronizing signal IVsync, performs image processing such as gamma processing, error diffusion processing, dither processing and the like, and generates a gradation signal Vpix of a pixel. Further, the sub-frame generation unit 14 converts the gradation signal Vpix of a pixel to sub-frame data SFw corresponding to the video mode VMode. The sub-frame data SFw generated here is supplied to the memory control unit MCON as display data to be written into the frame memory FM.

The frame memory FM has a first frame region FM1 and a second frame region FM2. The memory control unit MCON writes display data into one of the frame regions, and at the same time reads display data from the other frame region. Specifically, the frame memory FM has a double buffer configuration.

The memory control unit MCON writes the sub-frame data SFw to be supplied into one of the frame regions during a certain frame period, and at the same time reads sub-frame data SFr from the other frame region. Then, during the next frame period, the memory control unit MCON reads the sub-frame data SFr, which has been already written, from one of the frame regions, and writes the sub-frame data SFw into the other frame region. Specifically, the memory control unit MCON performs control so as to alternately read and write the sub-frame data from and into the first and second frame regions FM1 and FM2 for each frame. Such writing control and reading control are performed by read and write signals R/W1 and R/W2 sent from the memory control unit MCON.

A sub-frame data output unit 16 outputs the sub-frame data SFr, which has been read out by the memory control unit MCON, to display means which is not shown. The video mode signal VMode is supplied to the sub-frame data output unit 16, and the sub-frame data SFr is outputted to the display means in response to the video mode.

When distortion occurs in a cycle of the external synchronizing signal EVsync, the video mode determination unit 10 changes the stabilized signal STB into an unstable state, and monitors stability of the subsequent cycle of the external synchronizing signal EVsync. When detecting that the cycle of the external synchronizing signal EVsync is stabilized during several frames, the video mode determination unit 10 outputs the video mode signal VMode corresponding to the cycle, and switches the state of the stabilized signal STB to a stable state.

The memory control unit MCON alternately switches writing and reading into and from the first and second frame regions FM1 and FM2 in synchronization with the internal synchronizing signal IVsync, when the stabilized signal STB is in the stable state. Accordingly, during a period of time in which the external synchronizing signal EVsync is stable, in a certain frame period the display data of a present frame is written into one of the frame region, the display data of a previous frame is readout from the other frame region. In the next frame period the display data of this frame is written into the abovementioned other frame region, and the display data of a present frame (the frame before the next frame) is read out from the abovementioned one frame region. Specifically, in the stable period, writing and reading into and from the both frame regions FM1 and FM2 are alternately controlled.

On the other hand, when the stabilized signal STB is switched to the unstable state, the memory control unit MCON stops alternate switching of writing and reading into and from the first and second frame regions FM1 and FM2, and repeatedly performs reading of the sub-frame data SFr from one of the frame regions and writing of the sub-frame data SFw into the other frame region. This repetition continues until the stabilized signal STB is switched to the stable state. The sub-frame data SFr, which is read out repeatedly, is data that is written in a frame before the external synchronizing signal EVsync is switched to the unstable state, and also is data for generating an undistorted image. Therefore, the display means is repeatedly supplied with the same sub-frame data SFr, and, during the unstable state of the stabilized signal STB, is caused to repeatedly display a static image corresponding to such sate.

Figure 2:
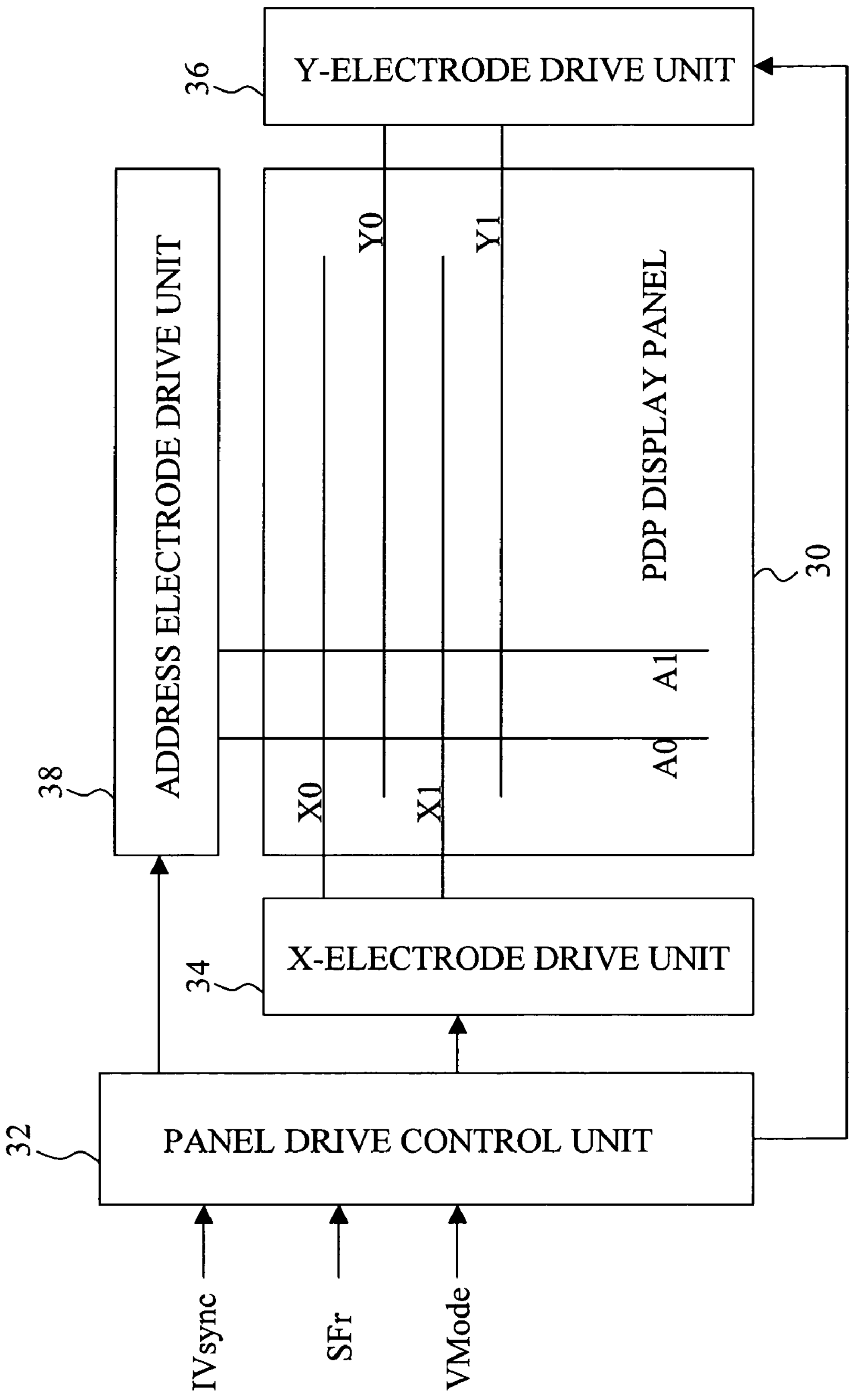
FIG. 2 is a configuration diagram of the display panel which is the display means in the embodiment.

FIG. 2 is a configuration diagram of the display panel which is the display means in the present embodiment. In this example, a PDP display panel is shown. A display panel 30 comprises X electrodes X0, X1 which extend in a horizontal direction on a display-side substrate, Y electrodes Y0, Y1 which also extend in a horizontal direction on the display-side substrate, and address electrodes A0, A1 which extend in a vertical direction on a back substrate. The internal synchronizing signal IVsync, the sub-frame data SFr which is display data, and the video mode signal VMode are supplied from the display control apparatus 100 to a panel drive control unit 32. The panel drive control unit 32 supplies an address data signal corresponding to the sub-frame data SFr to an address electrode drive unit 38, and controls X-electrode drive by an X-electrode drive unit 34 and Y-electrode drive by a Y-electrode drive unit 36 in synchronization with the internal synchronizing signal IVsync in response to the video mode signal VMode.

In the display panel 30 the address electrode A0 corresponding to the address data signal is driven in synchronization with scanning of the Y-electrode during an address period. During a sustained discharge period the X electrode and Y electrode are alternately driven and sustain-discharged with a cell which is lightened during the address period. Then, the sustained discharge period is controlled with respect to the video mode VMode.

Figure 3:
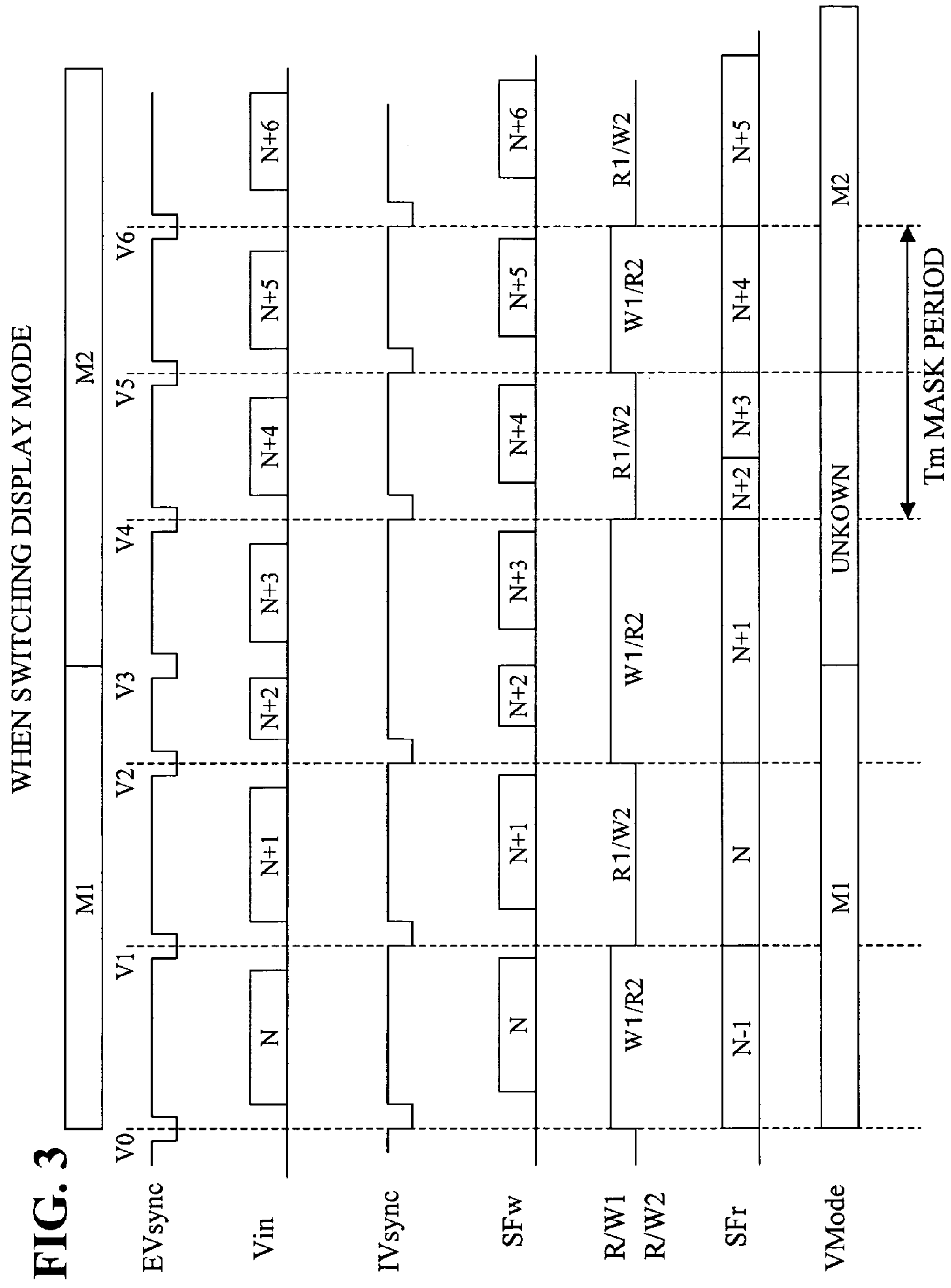
FIG. 3 is a diagram showing operation timing of a display control apparatus 100 at the time of display mode switching.

FIG. 3 is a diagram showing operation timing of the display control apparatus 100 at the time of display mode switching. FIG. 3 shows a conventional operation. In this example, the input video signal Vin of a video mode M1 is received at vertical synchronization timings V0, V1, and V2. The video mode M1 is switched to a video mode M2 at vertical synchronization timing V3. The input video signal Vin of the video mode M2 is received at subsequent timings V4, V5, and V6. Therefore, input video signals N, N+1, N+2 are inputted at the vertical synchronization timings V0 through V2, and input video signals N+3 through N+6 are inputted at the vertical synchronization timings V3 through V6. Furthermore, the video mode determination unit 10 generates the internal vertical synchronizing signal IVsync in which the pulses in the synchronization timing V3 are eliminated from the external vertical synchronizing signal EVsync. The video mode determination unit 10 further monitors a cycle of the external vertical synchronizing signal EVsync, determines a video mode thereof, and generates a video mode signal VMode.

The memory control unit MCON alternately writes the sub-frame data SFw into the first and second frame regions FM1 and FM2 in response to the internal vertical synchronizing signal IVsync, and alternately reads the sub-frame data SFr, which has been written, from the both frame regions FM2 and FM1. In order to do so, the write control and read control signals R/W1 and R/W2 are alternately controlled to a write state W1 and a read state R2, or a read state R1 and a write state W2.

For example, in a frame of the synchronization timing V0, the sub-frame SFw corresponding to the input video signal N is written into the first frame region FM1 by the write control signal W1, and the sub-frame data SFr corresponding to an input video signal N−1 is read from the second frame region FM2 by the read control signal R2. Moreover, in a frame of the synchronization timing V1, the sub-frame data SFw corresponding to the input video signal N+1 of a present frame is written into the frame region opposite of the abovementioned frame region, and the sub-frame data SFr corresponding to the input video signal N of a previous frame is read.

In the example FIG. 3, the video mode is switched during a frame period of the synchronization timing V2. For this reason, the video mode determination unit 10 determines the video mode M1 until the synchronization timing V3, but also detects that a cycle of the external synchronizing signal EVsync is brought to the unstable state after the synchronization timing V3, whereby a video mode to be detected is switched to an undetermined state (UNKNOWN). However, the video mode determination unit 10 maintains the video mode signal VMode in the previous video mode M1 until a video mode is decided.

The display data generation unit 20 generates the sub-frame data SFw, which is display data, in response to video mode VMode=M1, thus, in the frame period of the synchronization timing V3, the sub-frame data SFw corresponding to the input video signals N+2 and N+3 are written into the first frame region FM1. As a result, in a frame period of the next synchronization timing V4, the sub-frame data SFr of the input video signals N+2, N+3 is read from the first frame region FM1. The read sub-frame data SFr is an incomplete image, thus a distorted image is obtained if displayed as it is.

Moreover, the video mode determination unit 10 detects switching of the video mode only after detecting that a cycle of the external vertical synchronizing signal EVsync is a stable constant cycle throughout several frames, for example, two frames. Therefore, during the two frame periods after the synchronization timing V3, the video mode is in the unknown state. However, the internal video mode signal VMode is not yet switched to a new video mode M2, and the sub-frame data generation unit 14 and the like generate the sub-frame data SFw corresponding to the video mode M1 before the video mode was switched to the unknown state. Therefore, inconsistency occurs between the input video signal Vin and the internal video mode M1, and the sub-frame data SFw to be generated becomes an incomplete image.

Therefore, in the conventional display control apparatus, when a cycle of the external synchronizing signal EVsync changes, the sub-frame data SFr displaying a whole black image is created during a mask period Tm before the cycle is stabilized, and the whole black screen is displayed on the display panel.

In the case as well where the transmittance station (channel) is switched, distortion occurs in an image as in the case in which the video mode is switched.

Figure 4:
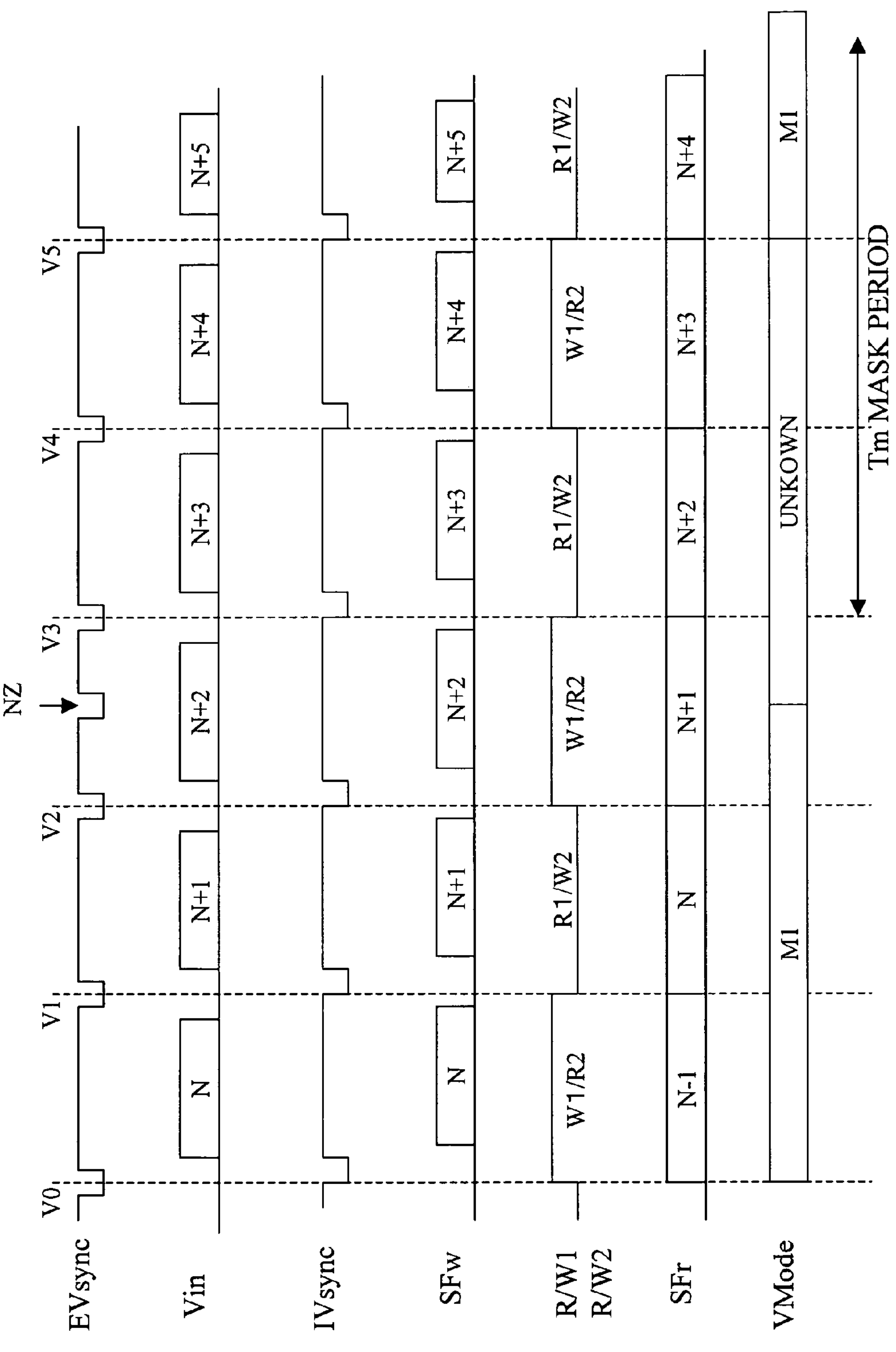
FIG. 4 is a diagram showing operation timing of the display control apparatus 100 when noise is generated in an external synchronizing signal.

FIG. 4 is a diagram showing operation timing of the display control apparatus 100 when noise is generated in the external synchronizing signal. FIG. 4 also shows a conventional operation. In this example, an input video signal Vin in the same mode throughout the vertical synchronization timings V0 through V5 is received, and a noise pulse NZ is generated in the external vertical synchronizing signal EVsync at the vertical synchronization timing V2. Therefore, the input video signals N through N+5 are inputted throughout the vertical synchronization timings V0 through V5. Furthermore, the video mode determination unit 10 generates an internal vertical synchronizing signal IVsync in which the noise pulse NZ is eliminated from the external vertical synchronizing signal EVsync. The video mode determination unit 10 further monitors a cycle of the external vertical synchronizing signal EVsync, determines a video mode thereof, and generates a video mode signal VMode. The memory control unit MCON alternately switches writing and reading into and from the first and second frame memory regions FM1 and FM2 in response to the internal vertical synchronizing signal IVsync.

Since the noise pulse NZ has been generated in the external vertical synchronizing signal during a frame period of the vertical synchronization timing V2, the video mode determination unit 10 detects a change in the cycle of the external vertical synchronizing signal, and the video mode is changed to an unknown state (UNKNOWN). However, as in the case described above, the internal video mode is maintained as the video mode M1 which is before the noise pulse is generated. When it is detected that the cycle corresponds to the video mode M1 stably during the 2 frame periods of the vertical synchronization timings V3 and V4, the video mode signal VMode is determined to be the video mode M1.

In this case, when the video mode is in the unknown state, if the display control apparatus is operated while maintaining the previous video mode M1, the display data corresponding to the input video signals N through N+5 can be supplied as is to the display means, and distortion is not generated on the screen. However, when distortion is detected in a cycle of the external vertical synchronizing signal EVsync, it is impossible to discriminate and detect whether switching of the video mode has occurred or simply a noise pulse has occurred. Therefore, in the prior art a whole black image is displayed in the mask period Tm until a video mode is decided.

In the conventional apparatus, as described above, in order to prevent image distortion, when a change occurs in a cycle of the external vertical synchronizing signal, a display signal for displaying a whole black image is outputted during the mask period Tm where the cycle is stably detected.

Figure 5:
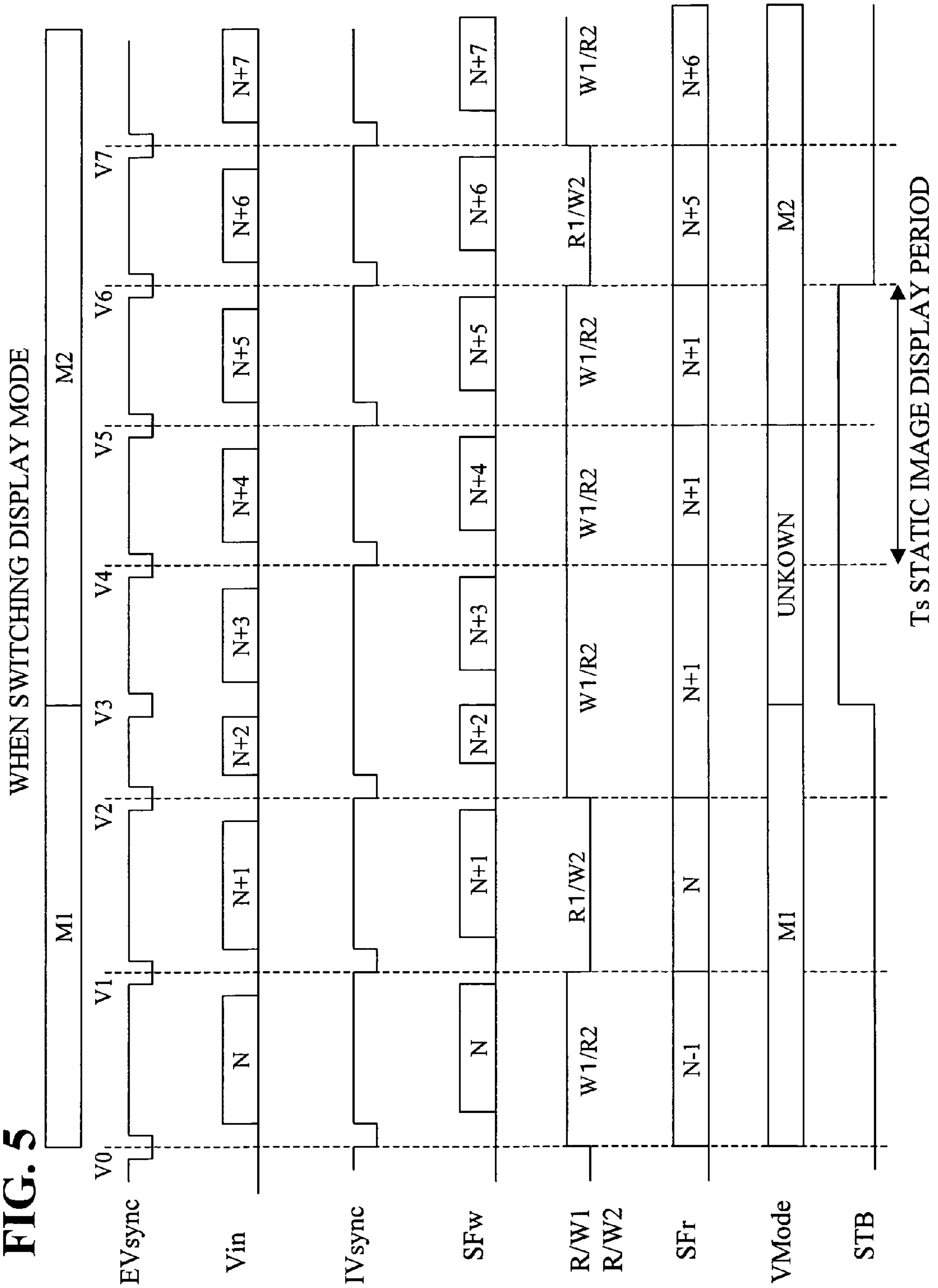
FIG. 5 is a diagram showing operation timing of the display control apparatus 100 at the time of the display mode switching in the embodiment.

FIG. 5 is a diagram showing operation timing of the display control apparatus 100 at the time of the display mode switching in the present embodiment. In this example, the video mode is switched from the mode M1 to the mode M2 in the same timing as in FIG. 3. Specifically, the video mode is switched at the synchronization timing V3 during the frame period of the synchronization timing V2, and the cycle of the external vertical synchronizing signal EVsync is changed.

In the present embodiment, the video mode determination unit 10 monitors a cycle of the external vertical synchronizing signal EVsync, and, when the cycle is switched, switches the state of the stabilized signal STB to an unstable state (H level). Although the video mode is brought to an unknown state, the internal video mode signal VMode is maintained in the previous mode M1. Thereafter, the video mode determination unit 10 counts the cycles of the external vertical synchronizing signal EVsync, switches the video mode signal VMode to a new video mode M2 when the same cycle is detected throughout several frames (two frames in the example of FIG. 5), and switches the stabilized signal STB to a stable state (L level) at the subsequent frames after the synchronization timing V6. Specifically, the video mode determination unit 10 detects stability in a cycle of the external vertical synchronizing signal EVsync in two frame periods of the synchronization timings V3 and V4, switches the video mode signal VMode to the mode M2 in a frame of the synchronization timing V5, performs switching operation of the stabilized signal STB in this frame, and switches the stabilized signal STB at a frame of the next synchronization timing V6 to the stable state (L level).

The memory control unit MCON performs control by alternately switching writing and reading into and from the first and second frame regions FM1 and FM2 during the period in which the stabilized signal STB is in the stable state (L level) as in the conventionally manner, and stops switching of writing and reading into and from the first and second frame regions FM1 and FM2 while the stabilized signal STB is in the unstable state (H level). Specifically, the memory control unit MCON maintains the write state W1 of the first frame region FM1 and the read state R2 of the second frame region FM2, which are set in the frame of the synchronization timing V2, in the frames of the synchronization timings V3, V4, and V5 as well. By performing control in this manner, the display data (sub-frame data) SFr, which is written normally into the second frame region FM2 in the frame of the synchronization timing V1, is repeatedly supplied to the display means in the frame periods of the synchronization timings V4 and V5 as well. Specifically, the display data corresponding to the input video signal N+1 is repeatedly outputted, and the image of the display data is repeatedly display by the display means. In this manner, the same image as in the frame of the synchronization timing V2 is repeatedly displayed in a static image display period Ts shown in FIG. 5.

Then, in the video mode determination unit 10, when a stable state of a cycle of the external vertical synchronizing signal EVsync is detected in the frame period of the synchronization timing V4, control for switching the stabilized signal STB to a stable state is performed in the frame period of the next synchronization timing V5, and the stabilized signal STB is switched to the stable state (L level) at the frames after the subsequent synchronization timing V6. In response to this, the memory control unit MCON resumes switching of writing and reading into and from the first and second frame regions FM1 and FM2 for each frame. Accordingly, since the display data corresponding to the input-video signal N+5 is already written into the first frame region FM1 in the frame of the synchronization timing V5, in the frame of the synchronization timing V6 where the stabilized signal STB is brought to the stable state (L level), the display data is read from the first frame region FM1, and supplied to the display means.

As described above, in the present embodiment, when detecting a change in a cycle of the external vertical synchronizing signal EVsync, the video mode determination unit 10 changes the stabilized signal STB to the unstable state, in response to which the memory control unit MCON stops switching of writing and reading into and from the first and second frame memories FM1 and FM2. Accordingly, the display data which is written appropriately can be repeatedly outputted until the external vertical synchronizing signal is stabilized, therefore, distortion of the display screen can be avoided, and display of a whole black image as in the prior art can also be avoided. In the static image display period Ts as well, the display data is continuously written into one of the frame memory regions, thus, after the cycle of the external vertical synchronizing signal EVsync is stabilized, the display control apparatus 100 can output an appropriate frame image N+5 immediately.

Even when the transmittance station (channel) has been switched, distortion of a display image can be avoided by means of the same operation as in the abovementioned case of switching the video mode. Specifically, in the frame in which the channel is switched, the display mode is switched to the unknown state temporarily, and a video mode is decided in a frame immediately after the switching. Therefore, at the time of switching, by means of the same operation as in the example shown in FIG. 3, the image before the channel is switched is displayed during two frame periods, an image after the channel is switched is displayed normally.

Figure 6:
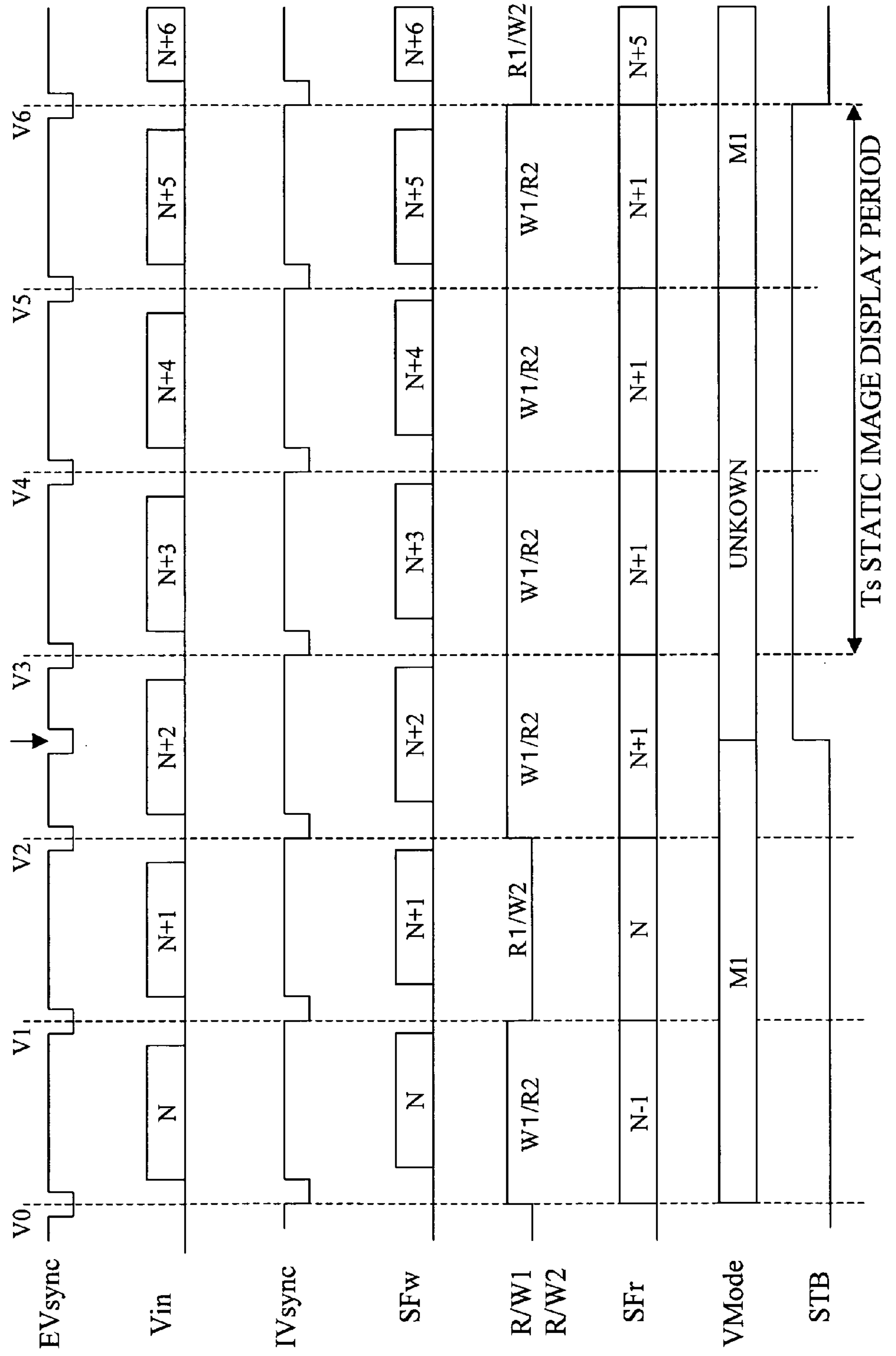
FIG. 6 is a diagram showing operation timing of the display control apparatus 100 when noise is generated in the external synchronizing signal in the present embodiment.

FIG. 6 is a diagram showing operation timing of the display control apparatus 100 when noise is generated in the external synchronizing signal in the present embodiment. In this example as well, as in FIG. 4, the noise pulse NZ is generated in the external vertical synchronizing signal EVsync in the frame of the synchronization timing V2. The video mode determination unit 10 detects a change in a cycle of the external vertical synchronizing signal EVsync through generation of the noise pulse NZ, and switches the state of the stabilized signal STB to the unstable state (H level). In response to this, the memory control unit MCON stops switching of writing and reading into and from the first and second frame regions FM1 and FM2 after the frame of the synchronization timing V3. For this reason, the display data SFr corresponding to the input video signal N+1, which is written into the second frame memory FM2 in the frame of the synchronization timing V1, is repeatedly read and outputted to the display means after the frame of the synchronization timing V2. Therefore, a frame image of the input video signal N+1 is outputted as a static image from the display means during the static image display period Ts.

The video mode determination unit 10 detects that the cycle of the external vertical synchronizing signal EVsync is stabilized in the frames of the synchronization timing V3 and V4, and decides the video mode signal VMode as the mode M1 at the frame of the synchronization timing V5. Moreover, the video mode determination unit 10 switches the state of the stabilized signal STB to the stable state (L level) at the frame of the synchronization timing V6. In association with this, the display data SFr of the input video signal N+5 written into the first frame region FM1 in the frame of the synchronization timing V5 is read in the frame of the synchronization timing V6, and supplied to the display means. Thereafter, the memory control unit MCON resumes switching of writing and reading into and from the first and second frame regions FM1 and FM2, and alternately writes and reads the display data corresponding to the external video signal.

As described above, in the case as well where the noise pulse is generated in the external vertical synchronizing signal EVcync, the display control apparatus 100 repeatedly reads the display data written appropriately into the frame memory before the noise pulse is generated, and supplies the display data to the display means, thus distortion of the screen and display of a whole black image can be avoided.

In the above embodiment, when detecting stability in a cycle of the external vertical synchronizing signal throughout two frame periods, the video determination unit 10 sets the video mode signal to a detection video mode, and brings the state of the stabilized signal to the stable state, but the number of frames required for determining the stable state does not have to be two and can be set to a desired number. However, setting the number to a plurality of frames can prevent switching of the video mode from being performed too quick by overresponding to the noise pulse.

In the above embodiment, the display control apparatus of the PDP display device has been explained as an example. However, the present embodiment is not limited to the PDP display device, and thus can be applied to a display device which creates display data from an input video signal and is display-driven on the basis of the display data, of a display control apparatus of a display device such as a liquid crystal display device or an electroluminescent display device.

What is claimed is:

1. A display control apparatus which is supplied with an input synchronizing signal and an input video signal, and which generates display data on the basis of the input synchronizing signal from the input video signal, and supplies the display data to display means, comprising:

a video mode determination unit which determines a video mode on the basis of the input synchronizing signal;

a display data generation unit which generates display data from the input video signal;

a frame memory which stores the display data in correspondence to a frame; and a memory control unit which controls writing and reading of the display data with respect to the frame memory, wherein the memory control unit writes first display data generated from an input video signal of a first frame into the frame memory, reads the first display data from the frame memory in a second frame subsequent to the first frame, and supplies the first display data to the display means, and wherein, when the video mode determination unit detects a change in a cycle of the input synchronizing signal during the second frame period, in response to the detection the memory control unit repeatedly supplies the first display data to the display means during a subsequent predetermined number of frame periods.

2. A display control apparatus which is supplied with an input synchronizing signal and an input video signal, and which generates display data on the basis of the input synchronizing signal from the input video signal, and supplies the display data to display means, comprising:

a video mode determination unit which determines a video mode on the basis of the input synchronizing signal;

a display data generation unit which generates display data from the input video signal;

a frame memory which stores the display data in correspondence to a frame; and a memory control unit which controls writing and reading of the display data with respect to the frame memory, wherein the memory control unit writes the display data of an input video signal of a present frame into a first frame memory region and a second frame memory region alternately, reads the display data of an input video signal of a previous frame alternately, and supplies the display data to the display means, and wherein when the video mode determination unit detects a change in a cycle of the input synchronizing signal, in response to the detection the memory control unit repeatedly supplies, to the display means, in a subsequent predetermined number of frame periods, the display data written into the frame memory during a frame period prior to the detection of the change in the cycle.

3. The display control apparatus according to claim 2, wherein the memory control unit writes display data corresponding to an input video signal of each frame period into one of the frame memory regions in the subsequent number of frame periods, and reads, from the other frame memory region, the display data which is written into the frame memory during the frame period prior to the detection of the change in the cycle.

4. The display control apparatus according to claim 2, wherein after the predetermined number of frame periods, display data corresponding to the input video signal is supplied to the display means.

5. The display control apparatus according to claim 2, wherein, when detecting that a cycle of the input synchronizing signal is stabilized throughout a plurality of frames, subsequently, supply of display data of a frame prior to the generation of a change in the cycle to the display means is stopped, and then supply of display data corresponding to the input video signal to the display means is resumed.

6. The display control apparatus according to claim 2, wherein the display means is a plasma display panel, and the display data is data of a plurality of sub-frame with different display luminance, which are allocated during the frame period.

7. A display device, comprising:

a display control apparatus which is supplied with an input synchronizing signal and an input video signal, and generates display data on the basis of the input synchronizing signal from the input video signal; and display means which is supplied with the display data from the display control apparatus and performs display on the basis of the display data, wherein said display control apparatus comprises;

a video mode determination unit which determines a video mode on the basis of the input synchronizing signal;

a display data generation unit which generates display data from the input video signal;

a frame memory which stores the display data in correspondence to a frame; and a memory control unit which controls writing and reading of the display data with respect to the frame memory, the memory control unit writes the display data of an input video signal of a present frame into a first frame memory region and a second frame memory region alternately, reads the display data of an input video signal of a previous frame alternately, and supplies the display data to the display means, and when the video mode determination unit detects a change in a cycle of the input synchronizing signal, in response to the detection the memory control unit repeatedly supplies, to the display means, in a subsequent predetermined number of frame periods, the display data written into the frame memory during a frame period prior to the detection of the change in the cycle.

* * * * *